United States Patent
Bianco et al.

(10) Patent No.: US 8,305,064 B2
(45) Date of Patent: Nov. 6, 2012

(54) CONTROL DEVICE FOR A SWITCHING CONVERTER

(75) Inventors: Alberto Bianco, Gressan (IT); Stefano Saggini, San Donato (IT); Mauro Olmo, Aosta (IT)

(73) Assignee: DORA S.p.A., Aosta (IT)

( * ) Notice: Subject to any disclaimer, the term of this patent is extended or adjusted under 35 U.S.C. 154(b) by 380 days.

(21) Appl. No.: 12/643,832

(22) Filed: Dec. 21, 2009

(65) Prior Publication Data

US 2010/0156375 A1    Jun. 24, 2010

(30) Foreign Application Priority Data

Dec. 24, 2008 (IT) .............................. MI2008A2318

(51) Int. Cl.
*G05F 1/575* (2006.01)
(52) U.S. Cl. ..................... 323/283; 323/284; 323/288
(58) Field of Classification Search .......... 323/282–286, 323/288
See application file for complete search history.

(56) References Cited

U.S. PATENT DOCUMENTS

| | | | |
|---|---|---|---|
| 6,356,063 B1 | 3/2002 | Brooks | |
| 7,723,970 B1 * | 5/2010 | Fernald | 323/282 |
| 2003/0048098 A1 | 3/2003 | Tran | |
| 2003/0173941 A1 * | 9/2003 | Harris et al. | 323/282 |
| 2003/0227279 A1 * | 12/2003 | Feldtkeller | 323/222 |
| 2004/0196013 A1 | 10/2004 | Chen et al. | |
| 2008/0252280 A1 * | 10/2008 | Prodic et al. | 323/283 |
| 2008/0303501 A1 * | 12/2008 | Prodic | 323/283 |
| 2009/0206810 A1 * | 8/2009 | Chellamuthu et al. | 323/282 |
| 2009/0310385 A1 * | 12/2009 | Maksimovic et al. | 363/21.1 |
| 2009/0322300 A1 * | 12/2009 | Melanson et al. | 323/284 |

* cited by examiner

*Primary Examiner* — Adolf Berhane
*Assistant Examiner* — Fred E Finch, III
(74) *Attorney, Agent, or Firm* — Seed IP Law Group PLLC

(57) ABSTRACT

A control device for a switching converter, the converter having at least one transistor supplied by an input voltage and adapted to supply a load by means of an output voltage. The converter also including a circuit adapted to turn on and off the at least one transistor. The control device includes an operation circuit adapted to change the state of the at least one transistor from turned on to turned off or vice versa, respectively when the output voltage goes down or goes up by a first voltage of a given value by defining a first state; the operation circuit including a further circuit adapted to generate a ramp signal and to change the first state of the at least one transistor from turned on to turned off or vice versa when the ramp voltage is equal to the output voltage of the converter.

14 Claims, 6 Drawing Sheets

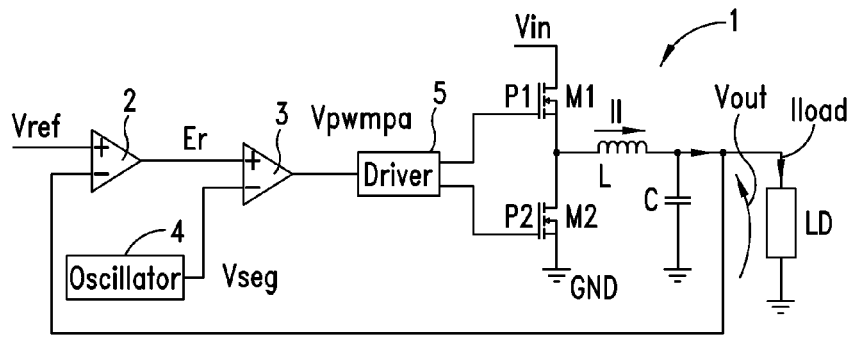
Fig. 1 *(Prior Art)*
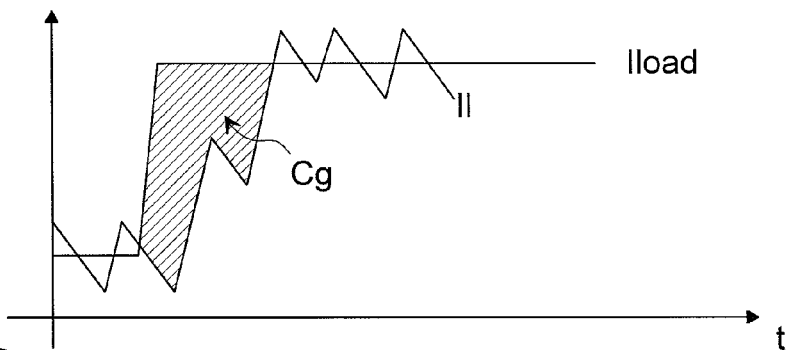
Fig. 2a
*(Prior Art)*
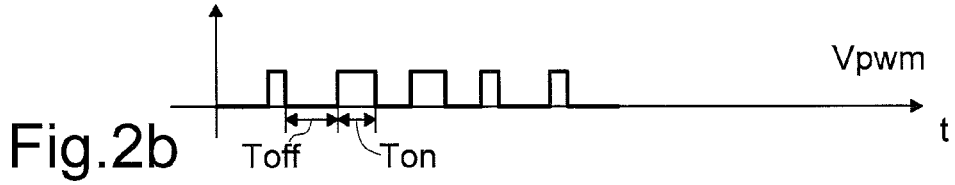
Fig. 2b
*(Prior Art)*
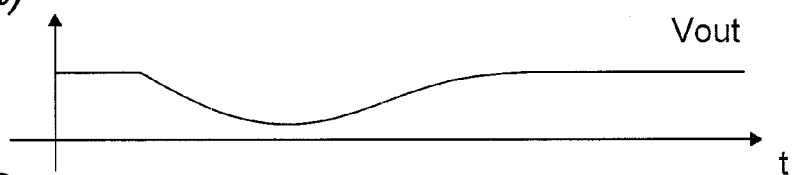
Fig. 2c
*(Prior Art)*

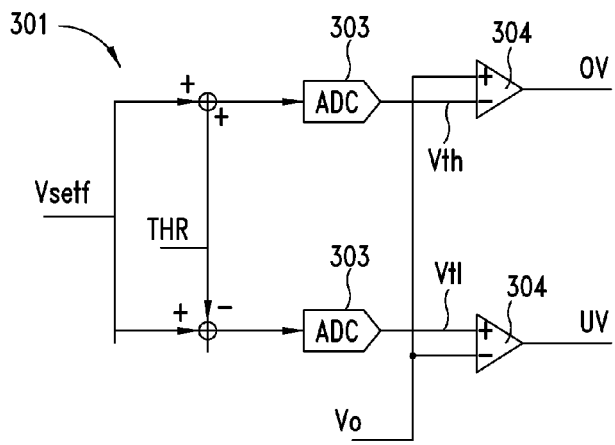
Fig.7
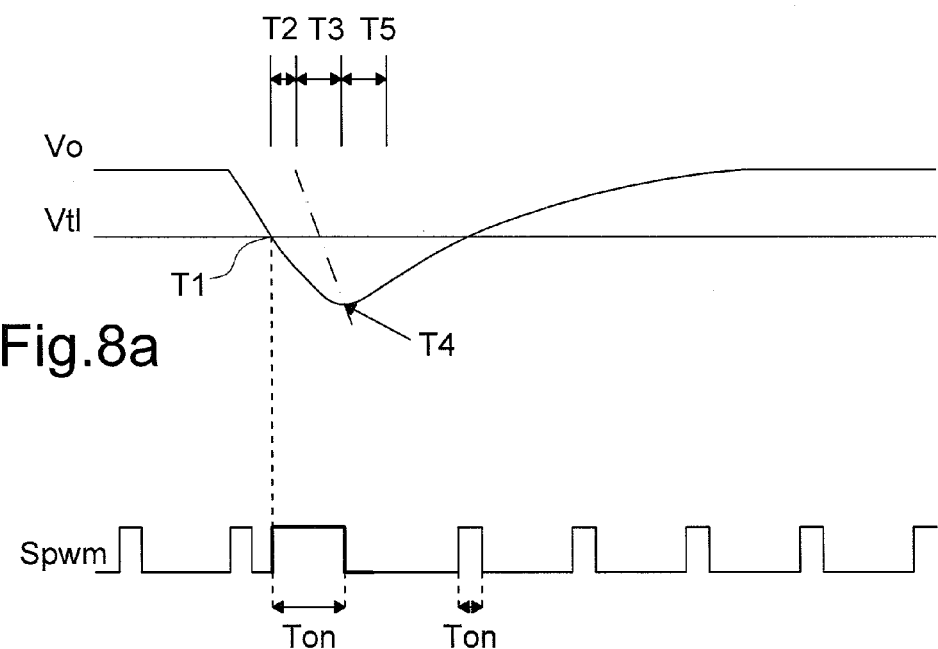
Fig.8a
Fig.8b

CONTROL DEVICE FOR A SWITCHING CONVERTER

BACKGROUND

1. Technical Field

The present disclosure relates to a control device for a switching converter.

2. Description of the Related Art

Switching converters, such as for example buck converters, using a Pulse Width Modulation (PWM) control scheme operating at a fixed frequency are presently used; this is mainly due to the noise immunity of the type of control, to the stability and to the fact that, in the type of control, the switching noise may be filtered. Converters having a PWM control operating at a fixed frequency have, however, a response to load transients, i.e., when the current required by the load suddenly varies, which is less efficient as compared to hysteresis converters.

At present, there exist circuit solutions in which the controllers of switching converters normally use a linear control operating at a fixed frequency but, in case of heavy load transients, they use a hysteresis control. The types of converters have, however, an unstable behavior or require a precise calibration in order to achieve an acceptable behavior.

FIG. 1 shows a buck converter in accordance with the known art. The converter includes a half-bridge 1 of MOS transistors M1 and M2 supplied by an input voltage Vin and connected to ground GND. The half-bridge is connected to an array of an inductance L and a capacitor C connected between the middle point of half-bridge 1, the terminal shared by transistors M1 and M2, and the ground GND. At the ends of capacitor C, there is the output voltage Vout which is also the voltage on the load LD. The voltage is sent to an error amplifier 2 adapted to compare voltage Vout with voltage Vref and to amplify the difference between the two voltages; the error amplifier includes a filter to improve accuracy and stability. The Voltage Er outputted from the error amplifier 2 is compared, by means of a comparator 3, with a saw-tooth voltage Vseg operating at a fixed frequency generated by an oscillator 4; the output signal at the comparator 3 is a square wave Vpwmpa operating at a fixed frequency and variable duty cycle. The signal is inputted to a driver 5 which is adapted to drive the MOS transistors M1 and M2 by means of the signals P1 and P2.

The main disadvantage of PWM controllers operating at a fixed frequency is the long response time.

If the converter load requires a high current Iload during the turning-off time Toff, the current is supplied by the output capacitor C, thus causing its discharge, until the control loop reacts thus increasing the current I1 into the inducer L during the turning-on time Ton; FIGS. 2a-2c show the charge Cg lost by capacitor C when increasing the current Iload and the corresponding droop of voltage Vout. In order to keep the control loop stable, the bandwidth of the loop must be less than about ¼ of the switching frequency, thus causing a slower response.

One suggested solution consists in forcing the turning-on of the PWM controller when the output voltage goes down a threshold voltage and in forcing its turning-off when the output voltage goes up another threshold voltage. This type of solution presents however some drawbacks: the method may not be used when a droop function is required as the output voltage must change upon load variations; if capacitor C has a low equivalent resistance or ESR, the control method appears to be unstable; the PWM frequency may uncontrollably increase if repeated high frequency transients occur, thus causing MOSs to overheat.

BRIEF SUMMARY

In the light of the state of the art, the present disclosure provides a control device for a switching converter that overcomes the previously disclosed disadvantages.

In accordance with the present disclosure, a control device for a switching converter is provided, the converter having at least one transistor supplied by an input voltage and adapted to supply a load with an output voltage, the converter including a circuit adapted to turn on and off the at least one transistor, the control device having an operation circuit adapted to change the state of the at least one transistor from turned on to turned off or vice versa, respectively, when the output voltage goes down or goes up by a first voltage of a given value, thus defining a first state, the operation circuit including a further circuit adapted to generate a ramp voltage, the operation circuit adapted to change the first state of the at least one transistor from turned on to turned off or vice versa when the ramp voltage is equal to the output voltage of the converter.

In accordance with the present disclosure, a circuit is provided that includes at least one transistor supplied by an input voltage and adapted to supply a load by means of an output voltage; and a control circuit adapted to control the at least one transistor, the control circuit comprising an operation circuit adapted to turn on and turn off the at least one transistor, a first digital circuit adapted to digitize the output voltage of the at least one transistor, a digital filter having at an input a difference between the output of the first digital circuit and a first voltage and adapted to generate an output voltage to set a turning on time interval of a next switching period for the at least one transistor, a second digital circuit having at an input the output signal of the digital filter and adapted to generate a square wave signal at a fixed frequency and variable duty cycle for driving the at least one transistor, and a droop function circuit coupled to an input of the digital filter and to receive the output of the at least one transistor, the droop circuit including an analog-to-digital converter adapted to convert current received from an inductor coupled to an output of the at least one transistor into digital form, and a multiplier circuit coupled to an output of the analog-to-digital converter circuit and structured to multiply the current from the analog-to-digital converter circuit that is received at an input to the digital filter to be subtracted from the output signal of the first digital circuit.

In accordance with another aspect of the foregoing embodiment, the circuit includes a triggering circuit having an input to receive the output from the inductor and a further input to receive a variable voltage and a further circuit adapted to receive an output from the triggering circuit and to generate a ramp up voltage therefrom.

In accordance with yet another aspect of the foregoing embodiment, the circuit includes a driver circuit having an input coupled to an output of the second digital circuit and an output coupled to the at least one transistor.

BRIEF DESCRIPTION OF THE SEVERAL VIEWS OF THE DRAWINGS

The features and the advantages of the present disclosure will be apparent from the following detailed description of practical embodiments thereof, shown by way of non-limitative examples in connection with the accompanying drawings, in which:

FIG. 1 shows a buck converter controlled by a PWM controller operating at a fixed frequency in accordance with the known art;

FIGS. 2a-2c show the on-load current, the PWM signal and the output voltage during a transient response;

FIG. 7 shows the operation device in FIG. 6 more in detail;

FIGS. 8a-8b show time diagrams of voltage Vo and signals S1 and Spwm during a load transient;

DETAILED DESCRIPTION

Figure 3:
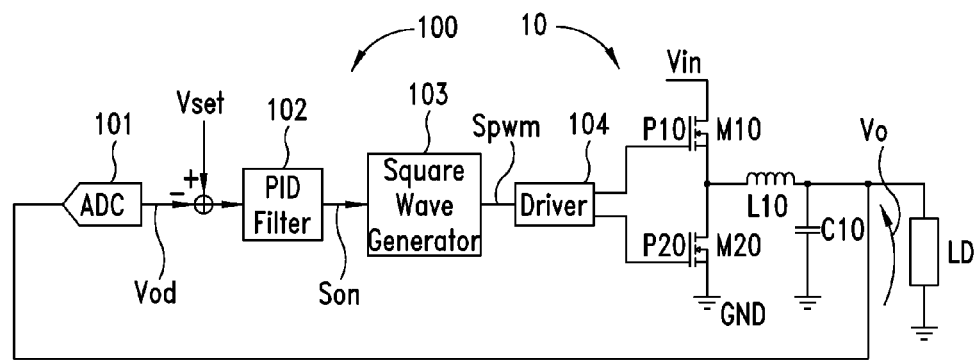
FIG. 3 shows a switching buck converter provided with the control device.
Figure 4:
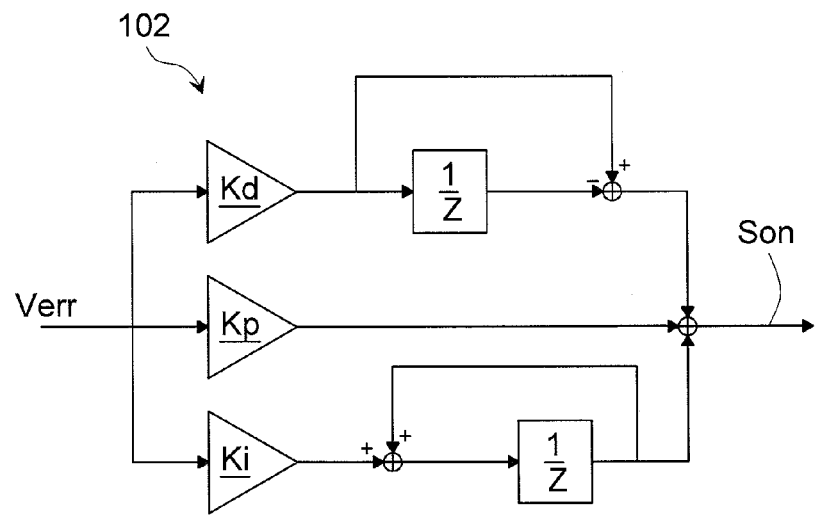
FIG. 4 shows the PID block in FIG. 3 more in detail.

FIG. 3 shows a switching buck converter having a switching period Tc, provided with a control device. The converter includes a half-bridge 10 of MOS transistors M10 and M20 supplied by an input voltage Vin and connected to ground GND. The half-bridge is connected to a series of an inductance L10 and a capacitor C10 connected between the middle point of half-bridge 1, the common terminal of the transistors M10 and M20, and the ground GND. At the terminals of capacitor C10, there is the output voltage V0, i.e., the voltage on the load LD. The voltage is sent to a control device 100 that includes an analog to digital converter 101 adapted to convert voltage Vo into digital form Vod. Voltage Vod is subtracted from a reference voltage Vset and the resulting voltage Verr is sent to a Proportional Integral Derivative (PID) filter 102 (shown in FIG. 4), which generates a signal Son adapted to set the turning on time interval of the next switching period. Signal Son is inputted to a block 103 which is a square wave generator digitally controlled by signal Son. The output signal at block 103 is a square wave Spwm operating at a fixed frequency 1/Tc and variable duty cycle; the duty cycle depends on the turning on time Ton which is set by filter 102. The signal is inputted to a driver 104, which is adapted to drive MOS transistors M10 and M20 by means of signals P10 and P20.

Figure 5:
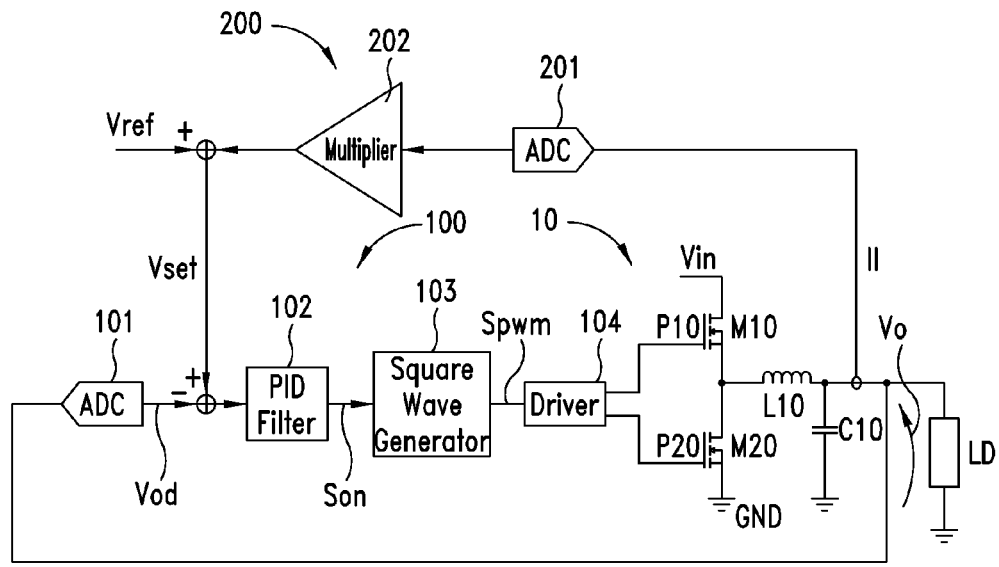
FIG. 5 shows a switching buck converter provided with the control device and a device having a droop function.

As shown in FIG. 5, a device 200 implementing a droop function is preferably added to the digital control loop. The device 200 includes an analog to digital converter 201 adapted to convert the current I1 through the inductor L into digital form, and a block 202 to multiply the current I1 by a factor Rdroop. Thereby, there is obtained a voltage Vdroop to be subtracted from voltage Vref in order to generate the variable voltage Vset which therefore depends on current I1; voltage Vset is in turn subtracted from voltage Vod.

Figure 6:
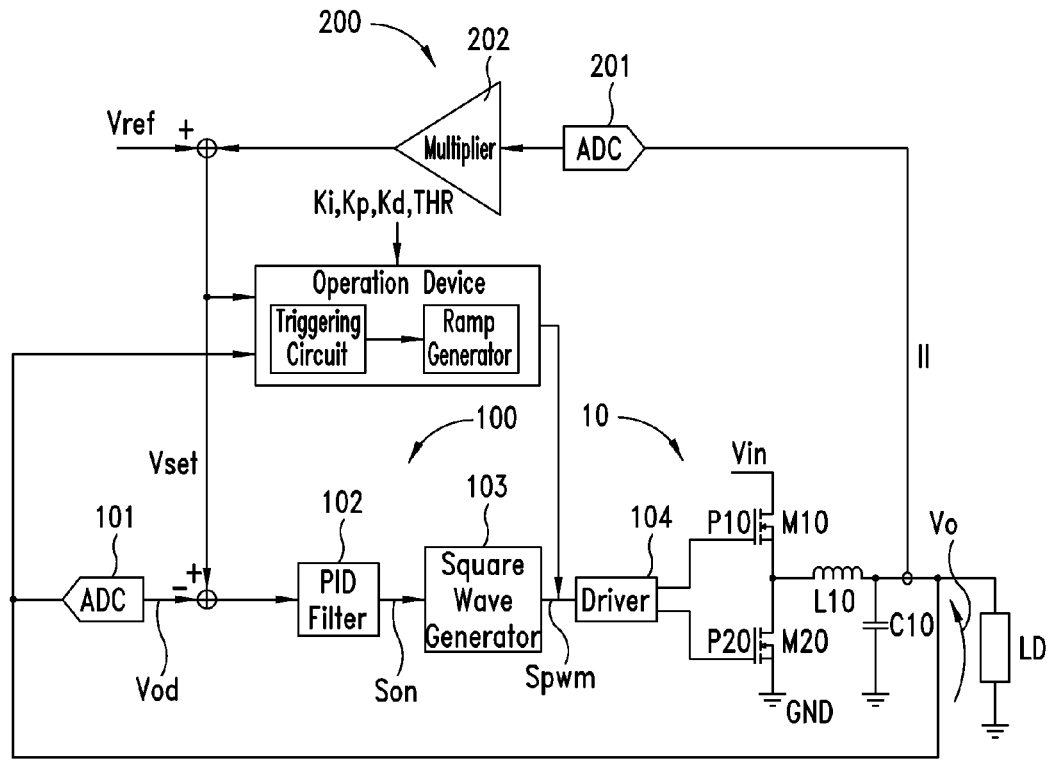
FIG. 6 shows a switching buck converter provided with the control device in accordance with the first embodiment of the present disclosure.

FIG. 6 shows a control device for a switching converter in accordance with a first embodiment of the disclosure. The control device includes an operation device or circuit 300 adapted to turn on or off the transistor M10 respectively when the output voltage Vod goes down or goes up. The reference voltage Vset of a given value. The operation device 300 includes a further circuit 302 adapted to generate a ramp voltage S1. The operation circuit 300 is adapted to turn off or on the transistor M10, i.e., adapted to change the state of transistor M10 from turned off to turned on and vice versa, when the ramp voltage S1 is equal to the output voltage Vo of the converter. The operation device 300 thus replaces the control circuit 103 when driving the transistor M10, preferably the transistor half-bridge 10, when the output voltage Vod goes down or goes up by the reference voltage Vset of a given value, i.e., when there is a load transient. If there is no device implementing a droop function, voltage Vset is the reference voltage Vref.

The operation device 300 remains inoperative during the normal operation of the control device 100, i.e., if the output voltage Vo remains below the voltage Vset, preferably within a tolerance band THR about voltage Vset. For such a reason, the operation device 300 includes a triggering circuit 301 where the width of the tolerance band THR is subtracted and added to voltage Vset, as seen in FIG. 7; the obtained voltage values are converted in analog form by the digital to analog converters 303 in order to achieve the voltages Vth=Vset+THR and Vtl=Vset-THR, which are compared with voltage Vo outputted from the converter by means of comparators 304. If the output voltage Vo is outside the tolerance band, there are obtained signals UV and OV which are at logic level 1, in particular if voltage Vo<Vtl the signal UV is at logic level 1; whereas, if voltage Vo>Vth, the signal OV is at logic level 1. If signal OV or signal UV is at logic level 1, the operation device 300 is turned on.

During the normal operation of the converter controlled by the device 100 with the PID filter 102, the turning on time Ton of the signal Spwm includes the sum of three terms; the first term is the integral of the error voltage Verr multiplied by the constant Ki, the second term is the error voltage Verr multiplied by the constant Kp, and the third term is the derivative of the error voltage Verr multiplied by the constant Kd, i.e., $$Ton = Ki \times Verr(1-z^{-1}) + Kp \times Verr + Kd \times Verr \frac{1}{1-z^{-1}}$$

In order to keep the control loop stable when using an output capacitor C10 with a high ESR (Equivalent Series Resistance), the term Kd=0; whereas, when using an output capacitor C10 with a low ESR, the term Kd will be much greater than the term Kp.

During the normal operation of the converter, the turning on time period Ton is substantially equal to the first term provided by the integral of the error voltage Verr multiplied by the constant Ki, since the other terms are negligible.

During the initial response to the transient, the turning on time period Ton is provided by: Ton=I+Kp×Verr(n)+Kd×Verr(n)−Kd×Verr(n−1), where I indicates the integrator and Verr(n−1) indicates the error voltage at the previous sample. If the output filter of the converter includes an output capacitor C10 with a low ESR, the proportional component is negligible as compared to that derived, and the previous equation may be simplified as:

$$Ton=I+Kd\times Verr(n)-Kd\times Verr(n-1)$$

Figure 9:
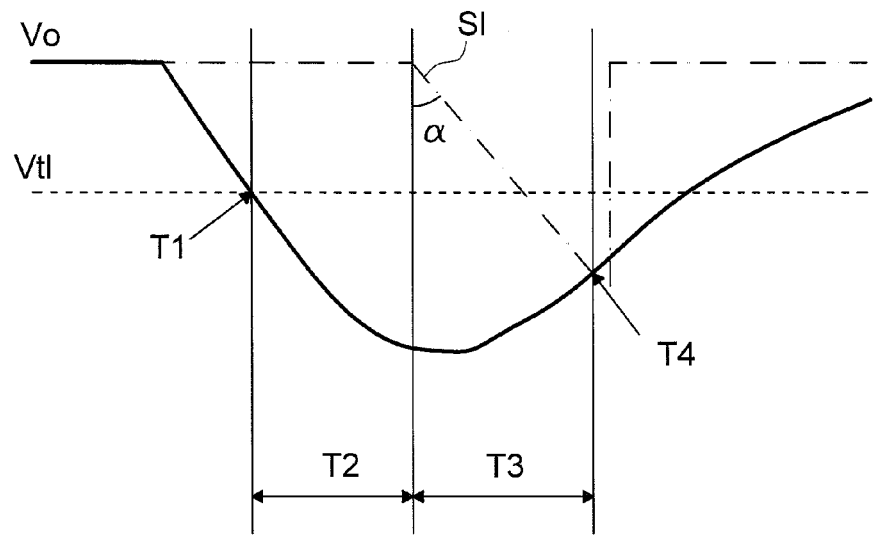
FIG. 9 is a more detailed time diagram as compared to that in FIGS. 8a-8b.

The operation device 300 takes the control of the signal Spwm outputted from the device 103 and are activated during the transient of load LD, i.e., when a high current is required by the load. FIGS. 8a, 8b, and 9 show the behavior of the operation device 300 triggered by the signal UV at logic level 1. The voltage Vo outputted from the converter crosses the voltage level Vtl at the time instant T1, as indicated in the figure, and the signal Spwm is forced to logic level 1. At the time period T2 provided by the time period stored in the integrator of the PID filter, the signal Spwm remains at logic level 1. At the end of the time period T2, the going down ramp S1 with the initial value Vint and an angle α starts while the signal Spwm is forced to value 1. The ramp signal S1 goes down until it crosses the voltage Vo, i.e., until its value becomes equal to the signal Vo, at the end of the time period T3 at the instant T4. At the instant T4, the signal Spwm is forced to logic level 0 and is kept at the logic level for at least the time period T5, which is such that the sum of the time periods T2, T3 and T5 is equal to the switching cycle time period.

In such a case, the duration of the time period Ton is Ton=I+Tramp, where Tramp is the time period T3, Tramp=T3 which may be calculated by Vo=Vint−αTramp from which Tramp=(Vint−Vo)/α. Considering the previous value of the time period Ton and the constant Kd to be greater than the constant Kp, Vint=Vo(n−1) is set, i.e., the last value measured by the block 101, and α=1/Kd is set thus obtaining Ton=I+Kd(−Vo(t)+Vo(n−1)). If voltage Vset is constant during the transient, the equations Ton=I+Kd×Verr(n)−Kd×Verr(n−1) and Ton=I+Kd(−Vo(t)+Vo(n−1)) are identical. If the block 102 is a PI filter, α=1/Kp and Vint=Vset are obtained, thus achieving the same result as in the case of a PID filter.

In order to increase the bandwidth of the non-linear response due to the operation device 300, α=K/Kd is used with K<1 and the device 300 becomes stable as a filter with a stable K/Kd constant. The relation k<1 may be used when a linear loop with a large phase margin is required.

If the operation device 300 is triggered by the signal OV at logic level 0, the voltage Vo outputted from the converter will cross the voltage level Vth and the signal Spwm is forced to logic level 0. In the time period given by the value of the time period stored in the integrator of the PID filter, the signal Spwm remains at logic level 0. At the end of the previous time period, the going up ramp S1 with the initial value Vint and an angle α starts while the signal Spwm is forced to value 0. The ramp signal S1 goes up until it crosses the voltage Vo, i.e., until its value becomes equal to the signal Vo. At this instant, the signal Spwm is forced to logic level 1 and is kept at the logic level until the time period expired from the beginning of the non-linear response is greater than a switching cycle time period.

In the case of a digital controller, the parameters a and Vint are automatically set. The stability of the non-linear response operated by device 300 is ensured by the stability of the compensation filter 102 of the PID or PI type. The non-linear response does not intervene on the medium switching frequency so that the switching overstress absence is ensured.

Figure 10A:
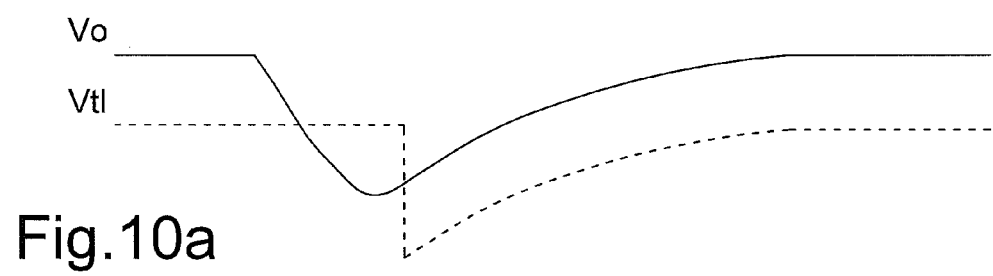
FIGS. 10a-10b show time diagrams of voltage Vout and signal Spwm during a load transient.
Figure 10B:

After the first non-linear response, a second non-linear response would preferably be triggered by the output voltage Vo which is outside the tolerance band THR. For this being avoided, circuit 301 takes the threshold voltage Vtl to a value equal to the output voltage Vod minus the width of the tolerance band THR, as shown in FIGS. 10a-10b, or takes the threshold voltage Vth to a value equal to the output voltage Vod plus the width of the tolerance band THR until the output voltage Vo returns to the nominal value.

Figure 11:
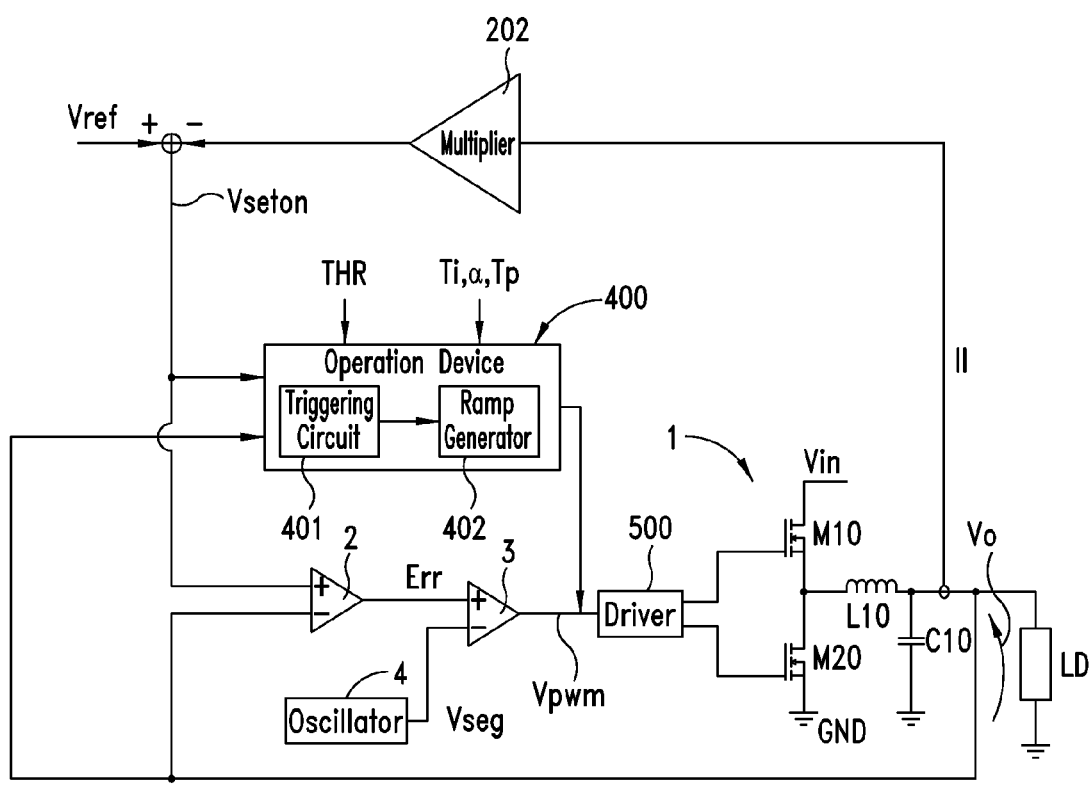
FIG. 11 shows a switching buck converter provided with the control device in accordance with the second embodiment of the present disclosure.

FIG. 11 shows a switching buck converter provided with a control device in accordance with the second embodiment of the present disclosure. The control device includes an operation device 400 adapted to turn on or off the transistor M10 respectively when the output voltage Vo goes down or goes up, the reference voltage Vseton of a given value. The operation device 400 includes a further circuit 402 adapted to generate a ramp voltage S1. The operation circuit is adapted to turn off or on the transistor M10 when the ramp voltage S1 is equal to the output voltage Vo of the converter, and when the output voltage Vo goes down or goes up, the reference voltage Vseton of a given value, respectively. The operation circuit 400 thus replaces the control device 103 when driving the transistor M10, preferably the transistor half-bridge 10, when the output voltage Vo goes down or goes up, the reference voltage Vset of a given value, i.e., when there is a load transient.

The voltage Vseton is preferably provided by the voltage Vref minus the voltage Vdroop provided by multiplying the current I1 by the resistance Rdroop of a block 202; the voltage Vseton is then subtracted from the voltage Vo. If no device implementing a droop function is present, the voltage Vset is the reference value Vref.

The converter includes elements similar to those of the converter in FIG. 1 and indicated by the same reference numbers. Therefore, the buck converter includes a half-bridge 1 of MOS transistors M10 and M20 supplied by an input voltage Vin and connected to ground GND. The half-bridge is connected to a series of an inductance L10 and a capacitor C10 connected between the middle point of half-bridge 1, the common terminal of the transistors M1 and M2, and the ground GND. At the terminals of capacitor C, there is the output voltage Vo. The voltage is sent to an error amplifier 2 adapted to compare voltage Vo with voltage Vseton and to amplify the difference between the two voltages; the error amplifier includes a filter to improve accuracy and stability. The voltage Err outputted from the error amplifier 2 is compared, by means of a comparator 3, with a saw-tooth voltage Vseg operating at a fixed frequency generated by an oscillator 4; the output signal at the comparator 3 is a square wave Vpwmpa operating at a fixed frequency and variable duty cycle. The signal is inputted to a driver 500, which is adapted to drive MOS transistors M10 and M20 by means of signals P10 and P20.

In the block 401 in which the width of the tolerance ban THR is subtracted and added to the voltage Vseton, the obtained voltage values are the voltages Vth and Vtl which are compared with the voltage Vo outputted from the converter by means of specific comparators. If the output voltage Vo is outside the tolerance band, there are obtained signals UV and OV which are at logic level 1. If signal OV or signal UV is at logic level 1, the operation device 400 is turned on.

The operation device 400, particularly the circuit 402, gets control over the signal Vpwm outputted from the device 3 and turn on during the transient, i.e., when a high current is required by the load. The voltage Vo outputted from the converter crosses the voltage level Vtl at a given time instant and the signal Vpwm is forced to logic level 1. The signal Spwm remains at logic level 1 for a given time period Ti set from the outside. At the end of the time period Ti, the going up ramp S1 with the initial value Vint and an angle α (again set from the outside) starts while the signal Vpwm is forced to value 1. The ramp signal S1 goes down until it crosses the voltage Vo, i.e., until its value becomes equal to the signal Vo after a time period Tii. At the instant when this crossing occurs, the signal Vpwm is forced to logic level 0 and is kept at the logic level for at least a given time period Tp, which is such that the sum of the time periods Ti, Tii and Tp is equal to the switching cycle time period.

If the operation device 400 is triggered by the signal OV at logic level 0, the voltage Vo outputted from the converter will cross the voltage level Vth and the signal Vpwm is forced to logic level 0. In the time period Ti, the signal Vpwm remains at logic level 0. At the end of the previous time period, the going up ramp S1 with the initial value Vint and an angle α starts while the signal Vpwm is forced to value 0. The ramp signal S1 goes up until it crosses the voltage Vo, i.e., until its value becomes equal to the signal Vo. At this instant, the signal Vpwm is forced to logic level 1 and is kept at the logic level until the time period elapsed from the beginning of the non-linear response is greater than a switching cycle time period.

As will be readily appreciated by those skilled in the art, the designs described above will find use in a variety of electronic applications, including without limitation power supplies for computers, computer processors, mobile communication devices, and the like.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching converter, configured to supply an output voltage, the control device comprising:
   an operation circuit configured to change a state of at least one transistor of the converter from turned on to turned off or vice versa, respectively, in response to the output voltage going down or going up by a first voltage, the operation circuit including ramp voltage generator circuit configured to generate a ramp voltage and change the state of the at least one transistor from turned on to turned off or vice versa when the ramp voltage is equal to an output voltage of the converter; and
   a triggering circuit configured to determine a lower threshold voltage and a higher threshold voltage as a function of the first voltage and a voltage tolerance range, compare the output voltage of the converter with the lower threshold voltage and the higher threshold voltage, and trigger the ramp voltage generator circuit if the output voltage of the at least one transistor is higher than the higher threshold voltage or is lower than the lower threshold voltage.

2. The device according to claim 1 wherein the first voltage is given by a difference between a reference voltage and a voltage given by the current flowing through a load multiplied by a resistance factor.

3. The device according to claim 1 wherein the ramp voltage generator circuit is configured to generate the ramp voltage signal after a first time period from a time instant the output voltage of the converter is equal to the higher threshold voltage or the lower threshold voltage, and to keep the turned on or turned off state of the at least one transistor for a second time period until the ramp voltage signal is equal to the output voltage of the converter.

4. The device according to claim 1 wherein the operation circuit is configured to maintain the turned on or the turned off state of the at least one transistor for a first time period after the output voltage of the converter is equal to the higher threshold voltage or the lower threshold voltage, and to maintain the turned on or turned off state of the at least one transistor for a second time period after the ramp voltage signal is equal to the output voltage of the converter in which a sum of a first time period and of the second time period is equal to a switching time period of the at least one transistor.

5. The device according to claim 1 wherein the triggering circuit is configured to, after a time instant wherein the ramp voltage is equal to the output voltage of the converter, bring the lower threshold voltage or the higher threshold voltage to a value given by the output voltage of the converter minus the voltage tolerance band or by the output voltage of the converter plus the voltage tolerance band if, respectively, the output voltage of the converter previously crossed the lower threshold voltage or the higher threshold voltage, until the output voltage of the converter returns to a nominal value.

6. The device according to claim 1 wherein the operation circuit includes a driving circuit configured to turn on and off the at least one transistor and generate a square wave signal at a fixed frequency and a variable duty cycle to control the turn-on and turn-off state of the at least one transistor as a function of a difference between the output voltage of the converter and the first voltage.

7. A switching converter, comprising:
   an output terminal configured to provide an output voltage;
   at least one transistor coupled to the output terminal and configured to be supplied by an input voltage;
   a driver circuit configured to turn on and off the at least one transistor;
   an operation circuit configured to cause the driver circuit to change a state of the at least one transistor from turned on to turned off or vice versa, respectively, in response to the output voltage going down or going up by a first voltage, the operation circuit including a ramp voltage generator circuit configured to generate a ramp voltage, the operation circuit configured to change the state of the at least one transistor from turned on to turned off or vice versa in response to the ramp voltage becoming equal to the output voltage of the converter; the operation circuit including:
      an analog/digital converter configured to convert the output voltage to a digital signal;
      a square wave generator circuit configured to provide to the driver circuit a square wave signal at a fixed frequency and a variable duty cycle for driving the at least one transistor; and
      a digital filter configured to receive a signal that represents a difference between the digital signal and the first voltage, generate a control signal to the square wave generator to set a turning on time interval of a next switching period of the square wave signal, provide a starting voltage of the ramp voltage, and control a rate of change of the ramp voltage.

8. The converter according to claim 7 wherein the digital filter is a PID filter configured to multiply a derivative of a difference between the digital signal and the first voltage by a derivative constant, provide the starting voltage of the ramp voltage based on a last value of the digital signal, and control the rate of change of the ramp voltage based on an inverse of the derivative constant.

9. The converter according to claim 7 wherein the digital filter is a PI filter configured to multiply a difference between the digital signal and the first voltage by a proportional constant, provide the starting voltage of the ramp voltage based on the first voltage, and control the rate of change of the ramp voltage based on an inverse of the proportional constant.

10. A device, comprising:
an output terminal configured to provide an output voltage;
at least one transistor coupled to the output terminal and configured to receive an input voltage;
an inductor coupled to the at least one transistor; and
a control circuit coupled to the at least one transistor, the control circuit including:
  an operation circuit adapted to turn on and turn off the at least one transistor, the operation circuit including a ramp voltage generation circuit configured to generate a ramp voltage having a starting voltage and a rate of change;
  a first digital circuit configured to convert the output voltage of the at least one transistor to a first digital signal;
  a digital filter coupled to the first digital circuit and configured to receive a difference between the first digital signal of the first digital circuit and a variable voltage and to generate an output signal to set a turning on time interval of a next switching period for the at least one transistor, the digital filter further configured to provide the starting voltage and the rate of change of the ramp voltage to the ramp voltage generation circuit;
  a second digital circuit configured to receive the output signal of the digital filter and to generate a square wave signal at a fixed frequency and variable duty cycle for driving the at least one transistor; and
  a droop function circuit coupled to the digital filter and to the inductor and having an analog-to-digital converter configured to convert current received from the inductor into a second digital signal, and a multiplier circuit coupled to the analog-to-digital converter circuit and structured to multiply the second digital signal from the analog-to-digital converter circuit by a resistance factor and generate a product voltage; and
  a subtraction circuit configured to subtract the product voltage from a reference voltage and to generate the variable voltage for the digital filter.

11. The device of claim 10 wherein the operation circuit comprises a triggering circuit configured to receive the variable voltage and a ramp voltage generator circuit configured to receive an output from the triggering circuit and to generate the ramp voltage therefrom.

12. The device of claim 10, further comprising a driver circuit having an input terminal coupled to the second digital circuit and to the operation circuit and an output terminal coupled to the at least one transistor.

13. The device of claim 12 wherein the digital filter comprises a PI filter.

14. The circuit of claim 12, wherein the digital filter comprises a PID filter.

* * * * *